(12) United States Patent
Eisenberg et al.

(10) Patent No.: US 8,704,871 B2
(45) Date of Patent: Apr. 22, 2014

(54) METHOD AND SYSTEM FOR CREATING A CONTINUOUS PRESENCE VIDEO-CONFERENCE

(75) Inventors: Aviv Eisenberg, Beer-Seva (IL); Niv Wagner, Rechovot (IL); Eyal Leviav, Tel Aviv (IL); Craig Clapp, Boxford, MA (US)

(73) Assignee: Polycom, Inc., San Jose, CA (US)

( * ) Notice: Subject to any disclaimer, the term of this patent is extended or adjusted under 35 U.S.C. 154(b) by 315 days.

(21) Appl. No.: 12/872,672

(22) Filed: Aug. 31, 2010

(65) Prior Publication Data

US 2012/0050454 A1 Mar. 1, 2012

(51) Int. Cl.
*H04N 7/14* (2006.01)
*H04B 1/66* (2006.01)

(52) U.S. Cl.
USPC .............. 348/14.09; 375/240.12; 375/240.15; 375/240.24; 375/240.25

(58) Field of Classification Search
USPC ...................... 348/14.09, 14.07, 14.08, 14.12; 375/240.12, 240.15, 240.24, 240.25
See application file for complete search history.

(56) References Cited

U.S. PATENT DOCUMENTS

| 5,764,277 A * | 6/1998 | Loui et al. .................. 348/14.01 |
| 8,164,618 B2 * | 4/2012 | Yang et al. ................. 348/14.09 |
| 2005/0008240 A1 * | 1/2005 | Banerji et al. ................ 382/238 |

* cited by examiner

*Primary Examiner* — Duc Nguyen
*Assistant Examiner* — Theodore Ndje
(74) *Attorney, Agent, or Firm* — Wong, Cabello, Lutsch, Rutherford & Brucculeri, L.L.P.

(57) ABSTRACT

One or more horizontal stripes are defined in a continuous presence video conferencing image, comprising one or more segments of the video image. The horizontal stripes may have different heights. A horizontal stripe builder associated with a continuous presence videoconferencing port composes and compresses the horizontal stripe from two or more video images received from a plurality of endpoints of the video conferencing system. A continuous presence image stream generator organizes compressed horizontal strips into a plurality of compressed continuous presence video streams for sending toward sites of the video conferencing system.

26 Claims, 6 Drawing Sheets

METHOD AND SYSTEM FOR CREATING A CONTINUOUS PRESENCE VIDEO-CONFERENCE

TECHNICAL FIELD

The present invention relates to the field of videoconferencing communication, and in particular to continuous presence (CP) video conferencing.

BACKGROUND ART

Videoconferencing enables individuals located remotely one from the other to conduct a face-to-face meeting. Videoconferencing may be performed by using audio and video telecommunications. A videoconference may be between as few as two sites (point-to-point), or between several sites (multi-point). A conference site may include a single participant (user) or several participants (users). Videoconferencing may also be used to share documents, presentations, information, and the like.

Participants (users) may take part in a videoconference via a videoconferencing endpoint (EP). An endpoint (EP) may be a terminal on a network. An endpoint may be capable of providing real-time, two-way, audio/visual/data communication with other terminals and/or with a multipoint control unit (MCU). An endpoint (EP) may provide information/data in different forms, such as audio; audio and video; and data and video. The terms "terminal," "site," and "endpoint" may be used interchangeably and the description, drawings, and claims of the present disclosure use the term "endpoint" as a representative term for above group.

An endpoint (EP) may comprise a display unit (screen) on which video images from one or more remote sites may be displayed. Example endpoints may be units of the POLYCOM® VSX® and HDX® series, each available from Polycom, Inc. (POLYCOM, VSX, and HDX are registered trademarks of Polycom, Inc.) A videoconferencing endpoint (EP) may send audio, video, and/or data from a local site to one or more remote sites, and display video and/or data received from the remote sites on its screen.

Video images displayed on a screen at an endpoint may be displayed in an arranged layout. A layout may include one or more segments for displaying video images. A segment may be a predefined portion of a screen of a receiving endpoint that may be allocated to a video image received from one of the sites participating in the videoconference session. In a videoconference between two participants, a segment may cover the entire display area of the screens of the endpoints. At each site, the segment may display the video image received from the other site.

Another example of a video display mode in a videoconference between a local site and multiple remote sites may be a switching mode. A switching mode may be such that video/data from only one of the remote sites is displayed on the local site's screen at a time. The displayed video may be switched to video received from another site depending on the dynamics of the conference.

In contrast to the switching mode, in a continuous presence (CP) conference, a conferee (participant) at a local terminal (site) may simultaneously observe several other conferees from different terminals participating in the videoconference. Each site may be displayed in a different segment of the layout, which is displayed on the local screen. The segments may be the same size or of different sizes. The combinations of the sites displayed on a screen and their association to the segments of the layout may vary among the different sites that participate in the same session. Furthermore, in a continuous presence (CP) layout, a received video image from a site may be scaled up or down, and/or cropped in order to fit its allocated segment size. It should be noted that the terms "conferee," "user," and "participant" are used interchangeably in this disclosure. The description, drawings, and claims of the present disclosure the term "conferee" may be used as a representative term for above group.

An MCU may be used to manage a videoconference. An MCU is a conference controlling entity that is typically located in a node of a network or in a terminal that receives several channels from endpoints and, according to certain criteria, processes audio and/or visual signals and distributes them to a set of connected channels.

Example MCUs may be the MGC-100, RMX 2000®, and RMX 4000®, available from Polycom Inc. (RMX 2000 and RMX 4000 are registered trademarks of Polycom, Inc.). Some MCUs may be composed of two logical units: a media controller (MC) and a media processor (MP). A more thorough definition of an endpoint (terminal) and an MCU may be found in the International Telecommunication Union ("ITU") standards, such as the H.320, H.324, and H.323 standards. Additional information regarding the ITU standards may be found at the ITU website www.itu.int.

In a CP videoconferencing session, the association between sites and segments may be dynamically changed according to the activities taking part in the conference. In some layouts, one of the segments may be allocated to a current speaker. The other segments of that layout may be allocated to other sites that were selected as "presented sites" or "presented conferees." A current speaker may be selected according to certain criteria, such as having the highest audio energy during a certain percentage of a monitoring period. The other "presented sites" may include the image of the conferee that was the previous speaker; the sites having audio energy above a certain thresholds; and certain conferees required by management decisions to be visible.

A received video image may be processed to meet a required segment size, resolution, etc. The video image may be processed by the MCU, including manipulation of the received video image, scaling up/down the image, and cropping a portion of the video image. An MCU may crop lines or columns from one or more edges of a received video image in order to fit it to an area of a segment in a certain layout. Another cropping technique may crop the edges of a received image according to a region of interest of the received image, as disclosed in co-owned U.S. patent application Ser. No. 11/751,558, the entire contents of which are incorporated herein by reference.

In a videoconferencing session, a size of a segment in a layout may be defined according to a layout type selected for the session. For example, in a 2×2 type layout each segment may be substantially a quarter of the display. If five sites are taking part in the session, then each conferee may view the other four sites simultaneously, for example.

In a CP videoconference, each presented site may be displayed over a portion of a screen. A participant typically prefers to see the video images from the other sites instead of his or her own video image. In a CP conference, each presented conferee is typically associated with an output port of an MCU. In some cases, a plurality of sites may receive a similar layout from an MCU, such as one of the layouts that are sent toward one of the presented conferees.

An output port typically comprises a CP image builder and an encoder. A CP image builder typically obtains decoded video images from each of the presented sites. The CP image builder may resize (scale and/or crop) the decoded video images to a required size of a segment in which the image will be presented. The CP image builder may further write the resized image in a CP frame memory in a location that is associated with the location of the segment in the layout. When the CP frame memory is completed with all the presented images located in their associated segments, then the CP image may be read from the CP frame memory by the encoder.

The encoder may encode the CP image. The encoded and/or compressed CP video image may be sent toward the endpoint of the relevant conferee. Output ports of an MCU are well known in the art and are described in multiple patents and patent applications. An example frame memory module may employ two or more frame memories, such as a currently encoded frame memory and a next frame memory. The memory module may alternately store and output video of consecutive frames. A reader who wishes to learn more about a typical output port is invited to read U.S. Pat. No. 6,300,973, which is incorporated herein by reference in its entirety for all purposes.

An output port typically consumes heavily computational resources, especially when the output port is associated with a high definition (HD) endpoint that displays high-resolution video images at a high frame rate. The resources needed for the output ports may limit the capacity of the MCU and have a significant influence on the cost of an MCU.

In order to solve the capacity/cost issue, some conventional MCUs offer a conference-on-port option, in which a single output port is allocated to a CP conference. In a conference-on-port MCU, all of the sites that participate in the session receive the same CP video image. Consequently, the presented conferees may see their own images.

SUMMARY OF INVENTION

The above-described deficiencies in videoconferencing do not limit the scope of the inventive concepts of the present disclosure in any manner. The deficiencies are presented for illustration only.

Embodiments of the present disclosure provide novel systems and methods that may be implemented in an MCU. The novel methods and systems enable handling a CP videoconference in an efficient manner without damaging the experience of the conferees. Some of the disclosed embodiments utilize a novel output port and a novel method for controlling and composing a plurality of CP video images in a videoconference, while saving a large amount of output video resources. The novel methods and systems further enable each presented site to obtain a CP video image that does not include video image from the conferee's own site.

In one embodiment, one or more horizontal stripes may be defined in a CP video image created in a video conferencing session, in which the defined horizontal stripes may comprise one or more segments of the CP video image. Some of the horizontal stripes may appear in two or more layouts that are currently presented at some of the sites.

The width of each horizontal stripe may be the same as a row of a CP video image. Thus, each horizontal stripe may comprise a row from each of the segments located along that stripe from left to right. The height of a horizontal stripe may be an integer number of rows of the CP video image. The horizontal stripes of a CP video image may have different heights.

One embodiment of a novel MCU may comprise a plurality of CP videoconference ports. Each CP videoconference port may be associated to a session of a CP videoconference and may comprise two layers of combiners. The first layer of combiners, referred as Horizontal Stripe Builders (HSBs), may each compose a horizontal stripe. A horizontal stripe may comprise one or more video images received from the plurality of sites, after being decoded. Each composed horizontal stripe may be sent toward an encoder that is associated with that HSB.

The second layer of combiners is referred as a CP Image Stream Generator (CPISG). The CP Image Stream Generator (CPISG) layer may be located after the encoders. The CP Image Stream Generator layer of combiners may obtain the relevant encoded horizontal stripes from the HSBs. The CPISG layer may organize the relevant encoded-horizontal stripes into a plurality of compressed CP video streams. Each compressed CP video stream of a CP compressed video image may be sent toward different presented sites.

Upon initiating a CP videoconferencing session, and/or each time a change in the presented conferees occurs, an example management and control module (MCM) of an MCU may collect information about the required CP layouts. The management and control module (MCM) may determine which conferees will be presented and in which segment of each of the CP video images. Based on the required CP layouts and the presented conferees, the MCM may design one or more combination of horizontal stripes that may be utilized for composing the different required CP video images.

In one embodiment, the MCM (management and control module) may design and process parameters of each of the required CP video images, one after the other. Each CP video image may be divided into horizontal stripes, in which each stripe may include at least one complete video image received from an endpoint that is associated with a presented conferee. The height of each horizontal stripe may be equal or larger than the height of the smallest segment in that horizontal stripe. In other embodiments, a horizontal stripe may include only portions of one or more video images, which means that the height of a stripe may be smaller than the smallest image embedded in that segment.

After designing the plurality of horizontal stripes, the MCM may scan the plurality of horizontal stripes and may delete redundant stripes. At the end of this designing process, a group of horizontal stripes may be defined, from which the required number of CP video images may be created or composed.

In an alternate embodiment, the design of the plurality of horizontal stripes may be implemented offline. A lookup table (LUT) may be created in which a plurality of layout types may be stored. Each layout type may include a plurality of segments. The lookup table (LUT) may comprise a link between a layout type and a group of horizontal stripes that may be used to create that layout type. The LUT (lookup table) may be loaded to the MCM and may be updated from time to time. The LUT (lookup table) may be used for designing the CP video images and their horizontal stripes.

In another alternate embodiment, both methods may be used. The LUT may be used for designing known layout types, and the designing process may be used for new layout types. The results of the designing process may be stored in the LUT for the next time that a new layout type will be needed.

After designing the plurality of CP video images and their group of horizontal stripes, an MCM according to one embodiment may allocate video resources for creating and combining the plurality of CP video images. A video decoder may be allocated per each participating endpoint. An HSB may be allocated per each horizontal stripe. Each HSB may comprise an encoder. A CP image stream generator (CPISG) may be allocated per each CP video image.

After allocating the video resources, each HSB may be associated with one or more decoders. Each of those associated decoders may be associated with an endpoint so that at least a portion of the endpoint's video image is presented in the relevant horizontal stripe. Each CPISG may be associated with one or more of the HSBs that build and encode the horizontal stripes that are needed for composing the associated CP video image. Instructions may be sent toward the video resources and the conferencing session may continue.

These and other aspects of the disclosure will be apparent in view of the attached figures and detailed description. The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Turning now to the figures in which like numerals represent like elements throughout the several views, embodiments, aspects and features of the disclosed methods, systems, and apparatuses are described. For convenience, only some elements of the same group may be labeled with numerals. The purpose of the drawings is to describe embodiments and not for limitation or for production use. Features shown in the figures are chosen for convenience and clarity of presentation only.

The terms "composed," "generated," "built," "combined," and "created" are used interchangeably in the present disclosure and should be understood to have the same meaning.

Figure 1:
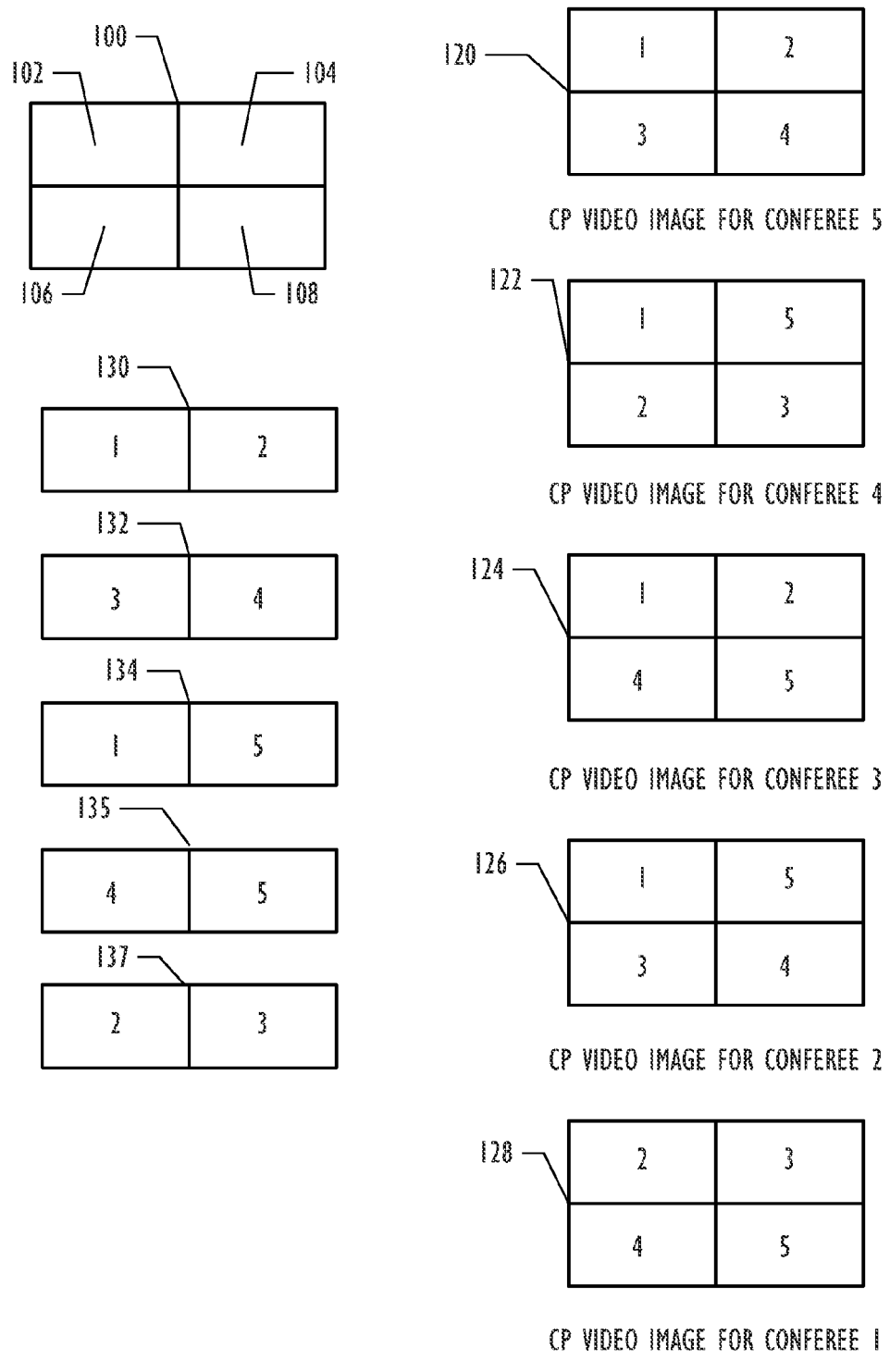
FIG. 1 illustrates a snapshot in a CP videoconferencing session and presents different CP video images and an example set of horizontal stripes that may compose those images, according to the teaching of the present disclosure.

FIG. 1 illustrates a snapshot of an example CP videoconferencing between five or more sites (conferees) according to one embodiment. In this session, a 2×2 type layout 100 has been used. Example layout 100 comprises four segments 102, 104, 106, and 108. Each segment may be in the size that is close to or substantially equal to a quarter of the layout (screen) 100. In such a layout, four different conferees (sites) may be presented simultaneously. In a conference call in which five sites take part, a 2×2 type layout 100 may be used. In order to display to each site the other four conferees, five CP video images (120, 122, 124, 126, and 128) may be composed at an MCU, and be transmitted toward each relevant conferee.

CP video image 120, that presents the video images of conferees 1, 2, 3, and 4, may be sent to conferee 1. CP video image 122, that presents the video images of conferees 1, 2, 3, and 5, may be sent to conferee 4. Similarly, CP video images 124, 126, and 128 may be sent to conferees 3, 2, and 1, respectively. If the videoconferencing session is between 6 or more sites using layout type 2×2, the sites that are not presented in any of the 5 CP video images 120 to 128, may obtain any one of the five CP video images. In some embodiments, the conferees not presented may obtain the CP video image that includes the current speaker, for example, CP image 120.

Each time a change in the presented conferees occurs, due to the dynamic of the session, a decision may be made regarding the appearance of the five CP video images (120 to 128). In the example snapshot of FIG. 1, the five different CP video images may be composed from five horizontal stripes 130, 132, 134, 135, and 137. Each horizontal stripe may be the width of the layout 100. The height of each stripe may be the height of one segment. In the example of layout 100, the height of one segment is equal to half of the height of layout 100.

Stripe 130 may include the video images of conferees 1 and 2 and may be used to compose CP video images 120 and 124, which are transmitted to conferees 5 and 3, respectively. Stripe 132 may include the video images of conferees 3 and 4 and may be used to compose the CP video images 120 and 126, which are transmitted to conferees 5 and 2, respectively. Stripe 134 may include the video images of conferees 1 and 5 and may be used to compose the CP video images 122 and 126, which are transmitted to conferees 4 and 2, respectively. Stripe 135 may include the video images of conferees 4 and 5 and may be used to compose CP video images 124 and 128, which are transmitted to conferees 3 and 1, respectively. Stripe 137 may include the video images of conferees 2 and 3 and may be used to compose CP video images 122 and 128, respectively. Thus, video image 120 may be composed from horizontal stripes 130 and 132; video image 122 may be composed from horizontal stripes 134 and 137; video image 124 may be composed from horizontal stripes 130 and 135; video image 126 may be composed from horizontal stripes 134 and 132; and video image 128 may be composed from horizontal stripes 137 and 135.

The novel method, which is used by embodiments of the present description, saves about 50% of the output video resources that are needed for the layout type of 2×2 that is used in the conference session of FIG. 1. The total number of pixels in each of the horizontal stripes 130, 132, 134, 135, and 137 is half of the number of pixels in each relevant CP video image 120, 122, 124, 126, and 128. Thus, the video resources needed for composing and encoding each horizontal stripe is substantially half of the video resources that are needed for composing and encoding a relevant CP video image.

Because five of the stripes 130, 132, 134, 135, and 137 are sufficient to compose the five CP video images 120, 122, 124, 126, and 128, the output video resources that are needed to compose the five different CP video images by using the five stripes, is substantially equal to the video resources that are needed to compose two and one half complete CP video images, thus only saving approximately 50% of the video resources necessary to compose the five CP video images in the conventional way. The efficiency of the novel method may vary from one layout type to another.

Figure 2:
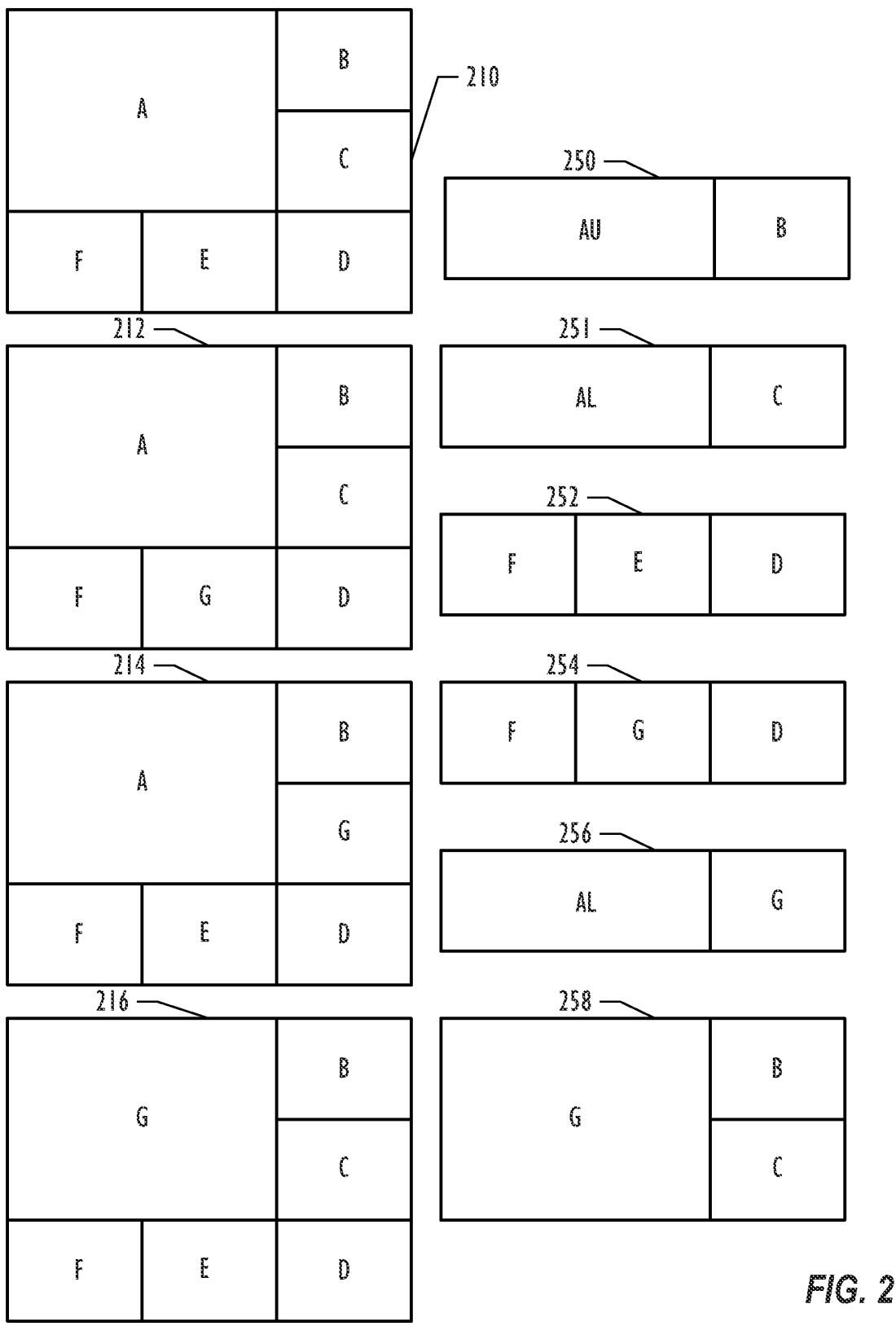
FIG. 2 illustrates a snapshot of another CP videoconferencing session and presents other different CP video images and another example set of horizontal stripes that may compose those images, according to the teaching of the present disclosure.

FIG. 2 illustrates four snapshots of four CP video images, 210, 212, 214, and 216, out of the seven that are used in a CP videoconference with seven or more conferees having a layout type of "5+1," in which five small segments are presented together with one large segment. Only four snapshots from four CP video images are illustrated in FIG. 2 for the purpose of clarity. Based on the four snapshots and the description below, a skilled person in the art may conclude how the other CP video images may look.

CP video image 210, which presents the video images of conferees A, B, C, D, E, and F, may be sent to conferee G. CP video image 212, which presents the video images of conferees A, B, C, D, G, and F, may be sent to conferee E. Similarly, CP video images 214 and 216 may be send to conferees C and A, respectively. At the time of the snapshot, conferee A is the current speaker and therefore his video image is associated with the larger segment. The rest of the presented conferees are presented in smaller segments. The CP video image 216 in this example is the CP video image that is sent toward the current speaker, conferee A. Therefore, conferee A's image is replaced with the video image of the previous speaker, conferee G.

The four CP video images 210, 212, 214, and 216 may be composed of 6 horizontal stripes 250, 251, 252, 254, 256, and 258. Each horizontal stripe may be the width of the CP video images. In FIG. 2, the height of each of the five horizontal stripes 250, 251, 252, 254, and 256 is the height of a small segment. The height of a small segment, in FIG. 2, is one-third (⅓) of the height of the CP video image. One horizontal stripe 258, in FIG. 2 has the height of the large segment, which is two thirds of the height of the CP video image.

Stripe 250 may include the upper half of the video image of site A (designated AU), and the video image of site B. Stripe 250 may be used to compose CP video images 210, 212, and 214 that are transmitted to conferees G, E, and C, respectively. Stripe 251 may include the lower half of the video images of conferee A (designated AL) and the video image of conferee C. Stripe 251 may be used to compose CP video images 210 and 212 that are transmitted to conferees G and E, respectively. Stripe 252 may include the video images of conferees F, E, and D. Stripe 252 may be used to compose CP video image 210, 214, and 216 that may be transmitted to conferees G, C, and A, respectively. Stripe 254 may include the video images of conferees F, G, and D. Stripe 254 may be used to compose CP video image 212 that may be transmitted to conferee E.

Stripe 256 may include the lower half of the video image of site A (designated AL) and the video image of site G. Stripe 256 may be used to compose CP video image 214 that is transmitted to conferee C. Stripe 258 may have the height of the large segment and comprises the entire video image of conferee G and the video images of conferees B and C, placed one below the other. Stripe 258 may be used to compose CP video image 216 that may be transmitted to conferee A.

The novel method which is used by one embodiment of the present description saves above 40% of the output video resources that are needed for creating the four CP video images 210, 212, 214, and 216 using conventional techniques, because the total number of pixels used in the six horizontals stripes 250-258 is equal to two and one third (2⅓) times the number of pixels used in one of the CP video images 210, 212, 214, and 216. Therefore, the video resources needed for composing and encoding the 6 horizontals stripes 250-258 is substantially two and one third (2⅓) the video resources that are needed for composing and encoding one of the relevant four CP video image 210-216, resulting in a 40% reduction in video resources required.

The efficiency of the novel method and system may vary from one layout type to the other. The allocation of video images to horizontal stripes and the layouts depicted in FIG. 1 and FIG. 2 are illustrative and by way of example only; other allocations and layouts may be used, some of which may require different numbers of horizontal stripes.

Figure 3:
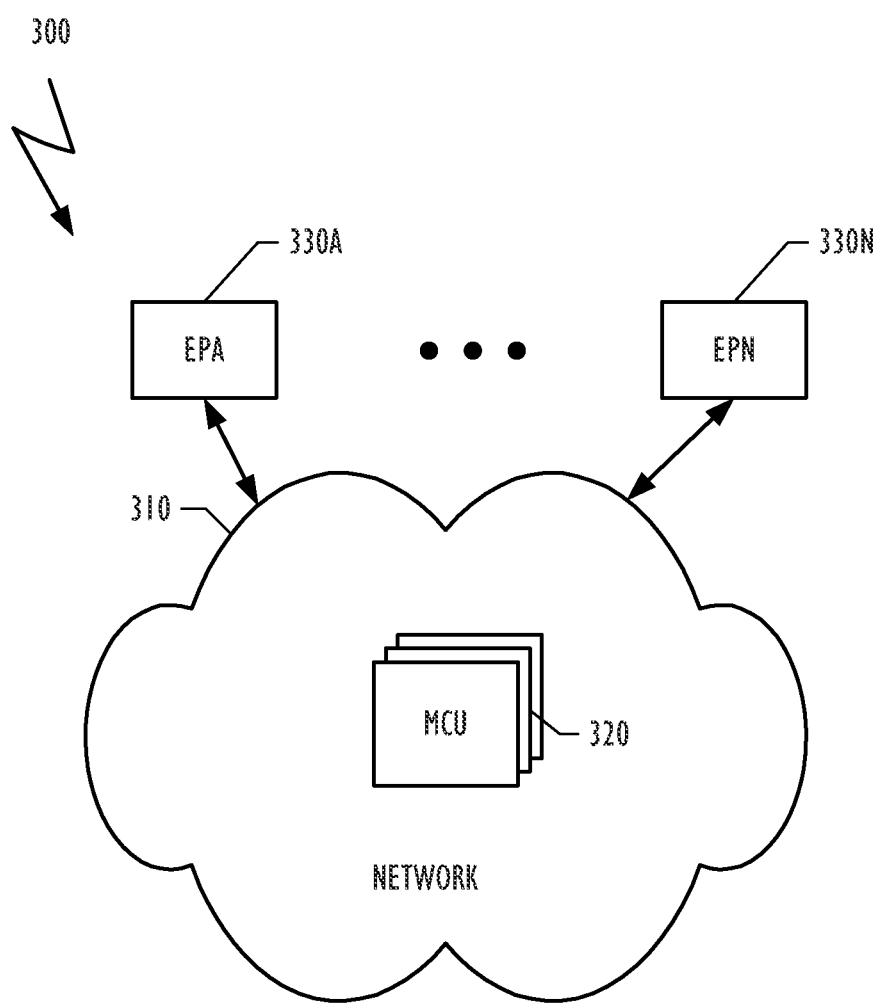
FIG. 3 depicts a block diagram with relevant elements of an example portion of a multimedia multipoint videoconferencing system in which one embodiment of the present disclosure may be implemented.

FIG. 3 depicts a block diagram with relevant elements of an example portion of a multimedia multipoint videoconferencing system 300 in which one embodiment of the present disclosure may be implemented. System 300 may include a network 310, one or more MCUs 320, and a plurality of endpoints 330a-n.

In some embodiments network 310 may include a load balancer (not shown in the drawings). The load balancer may be capable of controlling the plurality of MCUs 320. The load balancer promotes efficient use of the MCUs 320, because they are controlled and scheduled from a single point. Additionally, by combining the MCUs 320 and controlling them from a single point, the probability of successfully scheduling an impromptu videoconference is greatly increased. One example load balancer is a DMA® 7000, available from Polycom, Inc. (DMA is a registered trademark of Polycom, Inc.) More information on load balancers can be found in U.S. Pat. No. 7,174,365, which is hereby incorporated by reference in its entirety for all purposes, as if fully set forth herein.

An endpoint 330 is a terminal on a network, capable of providing real-time, two-way audio/visual/data communication with other terminals or with a multipoint control module (MCU, discussed in more detail below). An endpoint 330 may provide speech only, speech and video, or speech, or data and video communications. A videoconferencing endpoint typically comprises a display module on which video images from one or more remote sites may be displayed.

Example endpoints 330 may include: POLYCOM® VSX® and HDX® series, each available from Polycom, Inc. (POLYCOM, VSX, and HDX are registered trademarks of Polycom, Inc.). The plurality of endpoints (EP) 330a-n may be connected via the network 310 to the one or more MCUs 320. In embodiments in which a load balancer exists, then the endpoints (EP) 330a-n may communicate with the load balancer before being connected to one of the MCUs.

The MCU 320 is a conference controlling entity. In one embodiment, the MCU 320 may be located in a node of the network 310 or in a terminal that receives several channels from access ports and, according to certain criteria, processes audiovisual signals and distributes them to connected channels. Examples of an MCU 320 are the MGC-100 and RMX 2000® MCUs, which are products of Polycom, Inc. (RMX and RMX 2000 are registered trademarks of Polycom, Inc.) An MCU 320 may be an IP MCU, which is a server working over an IP network. An IP MCU 320 is only one of many different network servers that may implement the teachings of the present disclosure. Therefore, the present disclosure should not be limited to only an IP MCU.

The MCU 320 may comprise a management and control module (MCM) and one or more CP video conferencing ports (CPVP). An MCM may be configured to obtain different parameters of the required layout in a conference session, such as the type of layout (2×2, 5+1, etc.), the number of participants, resolution, the compression standard, etc. Based on the obtained parameters, the MCM may define the numbers of CP video images that will be needed in the session, the number of horizontal stripes that are needed for composing the needed CP video images, assign a CPVP to the session, and allocate the required video resources to the CPVP. During the videoconferencing session, the MCU may change the presented conferees according to the dynamic of the session and accordingly change the setting of the assigned CPVP. More information on the MCU 320 is disclosed below in conjunction with FIGS. 4-6.

Network 310 may represent a single network or a combination of two or more networks such as Integrated Services Digital Network (ISDN), Public Switched Telephone Network (PSTN), Asynchronous Transfer Mode (ATM), the Internet, a circuit switched network, and an intranet. The multimedia communication over the network may be based on one or more communication protocols such as H.320, H.321, H.323, H.324, and Session Initiation Protocol (SIP). More information about those communication protocols may be found at the International Telecommunication Union (ITU) and Internet Engineering Task Force (IETF) websites.

An endpoint 330a-n may comprise a user control device (not shown in picture) that may act as an interface between a user of the EP 330 and the MCU 320. The user control device may be a dialing keyboard that uses DTMF (Dual Tone Multi Frequency) signals. Other dedicated control devices may use other control signals in addition to or instead of DTMF signals, such as far end camera control signaling according to ITU standards H.224 and H.281.

Each of the endpoints 330a-n may also comprise a microphone (not shown in the drawing) to allow users at the endpoint to speak within the conference or contribute to the sounds and noises heard by other users; a camera to allow the endpoints 330a-n to input live video data to the conference; one or more loudspeakers to enable hearing the conference; and a display to enable the conference to be viewed at the endpoint 330a-n. Endpoints 330a-n missing one of the above components may be limited in the ways in which they may participate in the conference.

The described portion of system 300 comprises and describes only the relevant elements. Other sections of a system 300 are not described herein. Depending upon its configuration and the needs of the system, each system 300 may have different numbers of endpoints 330, networks 310, load balancers, and MCUs 320. However, for purposes of clarity of the drawing, two endpoints and one network with a plurality of MCUs are illustrated in FIG. 3.

Figure 4:
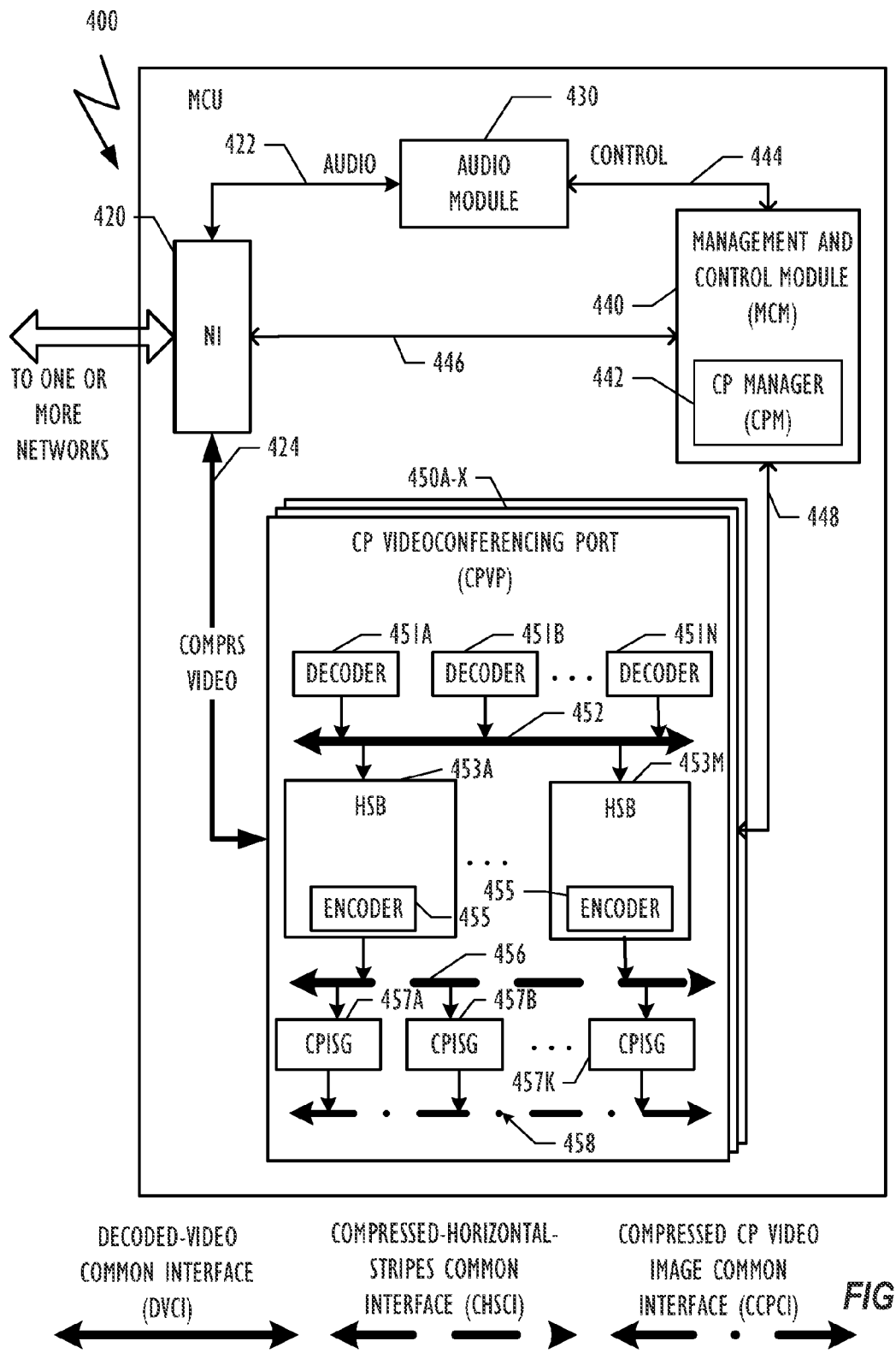
FIG. 4 depicts a block diagram with relevant elements of an example portion of an MCU, according to teaching of the present disclosure.

FIG. 4 is a block diagram illustrating elements of a portion of an MCU 400 according to one embodiment. Alternative embodiments of an MCU 400 may have other components and may not include all of the components shown in FIG. 4.

The MCU 400 may comprise a Network Interface (NI) 420, an audio module 430, a management and control module (MCM) 440, and one or more CP video ports (CPVPs) 450a-x. Network Interface (NI) 420 may act as an interface between the plurality of endpoints 330a-n and internal modules of the MCU 400. In one direction, the NI 420 may receive multimedia communication from the plurality of endpoints 330a-n via the network 310. The NI 420 may process the received multimedia communication according to communication standards, such as H.320, H.321, H.323, H.324, and SIP. Some communication standards require that the process of the NI 420 include de-multiplexing the incoming multimedia communication into compressed audio, which is transferred toward the audio module 430; compressed video, which is transferred toward the CPVP, data, and control streams, which are transferred toward the MCM 440. In other communication standards, each type of media is received via a separate channel. In those standards, de-multiplexing is not needed.

In the other direction the NI 420 may transfer multimedia communication from the MCU 400 internal modules toward one or more endpoints 330a-n, via network 310. NI 420 may receive separate streams from the various internal modules of the MCU 400. The NI 420 may multiplex and process the streams into multimedia communication streams according to one of the communication standards. NI 420 may transfer the multimedia communication toward the network 310, which may carry the streams toward one or more endpoints 330a-n.

More information about communication between endpoints and/or MCUs over different networks, and information describing signaling, control, compression, and how to set a video call, may be found in the ITU standards H.320, H.321, H.323, H.261, H.263 and H.264.

The Audio module 430 may receive, via NI 420 and through an audio link 422, compressed audio streams from the plurality of endpoints 330a-n. The audio module 430 may process the received compressed audio streams, decompress and/or decode, mix relevant audio streams, encode and/or compress the mixed decoded audio stream, and transfer the compressed encoded mixed signal via the audio link 422 and the NI 420 toward the endpoints 330a-n.

In one embodiment, the audio streams that are sent toward each of the relevant endpoints 330a-n may be different, according to the needs of each individual endpoint 330. For example, the audio streams may be formatted according to a different communications standard for each endpoint 330a-n. Furthermore, an audio stream sent to an endpoint 330 may not include the voice of a user associated with that endpoint 330, while the user's voice may be included in all other mixed audio streams sent to the other endpoints 330.

In one embodiment, the audio module 430 may include at least one DTMF module (not shown in the drawing). DTMF module may grab and detect DTMF signals from the received audio streams. The DTMF module may convert DTMF signals into DTMF control data. DTMF module may transfer the DTMF control data via a control link 444 to an MCM 440.

The DTMF control data may be used to control features of the conference. Example DTMF control data may be commands sent by a participant at an endpoint 330 via a click-and-view function. A reader who wishes to learn more about the click-and-view function is invited to read U.S. Pat. No. 7,542,068, the content of which is incorporated herein by reference in its entirety for all purposes. In other embodiments, endpoints 330 may use a speech recognition module (not shown) in addition to, or instead of, the DTMF module. In these embodiments, the speech recognition module may use vocal commands and the user's responses for controlling parameters of the videoconference.

Further embodiments may use or have an Interactive Voice Recognition (IVR) module that instructs the user in addition to or instead of a visual menu. The audio instructions may be an enhancement of the video menu. For example, audio module 430 may generate an audio menu for instructing the user how to participate in the conference and/or how to manipulate the parameters of the conference. The IVR module is not shown in FIG. 4.

In addition to common operations of a typical MCU, MCU 400 may be capable of additional operations as result of having the MCM 440 and a CP manager (CPM) 442. The MCM 440 may control the operation of the MCU 400 and the operation of its internal modules, including the audio module 430, the NI 420, and the plurality of CPVPs 450a-x.

The MCM 440 may include logic modules that can process instructions received from the other internal modules of the MCU 400 as well as from external devices such as load balancers or EPs 330. Status and control information to and from the endpoints 330a-n or a load-balancer may be sent via control bus 446, NI 420 and network 310, and vice-versa. MCM 440 may receive status information from the audio module 430 via the control link 444, and/or from the CPVPs 450a-x via a control link 448. The MCM 440 may process the received status and commands and accordingly may change setting of the internal modules of the MCU 400 as well as the endpoints 330a-n. Some unique operations of the MCM 440 are described in more details below with conjunction with FIGS. 5 and 6.

In addition to conventional operations of an MCU, the MCU 400 may be capable of additional operations as result of having the one or more CPVPs 450a-x. Each CPVP 450a-x may be allocated to a session. One embodiment of a CPVP 450a-x may receive, process, and send compressed video streams. The CPVP 450a-x may include a plurality of decoders 451a-c, a decoded video common interface (DVCI) 452, a plurality of HSBs 453a-m, a compressed-horizontal-stripe-common interface (CHSCI) 456, a plurality of CP image stream generators (CPISGs) 457a-k and a compressed CP video image common interface (CCPCI) 458. Each HSB 453 may comprise an encoder 455. The CCPCI 458 may be a section of the compressed video bus 424.

The CPVPs 450a-x may obtain instructions from the CPM 442, via link 448 for example, such as the layout type; which decoded video images from decoders 451a-n to compose by each HSB 453; and which horizontal stripe to combine in each CPISG 457a-k in order to compose the appropriate CP video images. Further, when the H.264 compression standard is used, CPM 442 may instruct each one of the encoders 455 to prevent Deblocking-Filtering in the first line of Macro Blocks of each encoded horizontal stripe. Furthermore, CPM 442 may send a similar Sequence Parameter Set (SPS) and similar Picture Parameter Set (PPS) to each one of the encoders 455.

Each decoder 451 may be associated to an endpoint 330 that is taking part in the videoconference session and may obtain compressed video streams received from its associated endpoint via NI 420 and video bus 424. Each decoder 451 may decode the obtained compressed video streams into decoded video data. The decoded video data may be output toward DVCI 452. An example DVCI 452 may be a group of one or more shared memories. Each shared memory may be shared between a decoder 451 and the plurality of HSB 453a-m. Each shared memory may comprise a plurality of frame memories, the associated decoder 451a-n may write decoded video data into its associated frame memory. Each one of the HSB 453a-k may read the stored decoded data from a frame memory embedded in DVCI 452. In other embodiments DVCI 452 may be a shared cyclic memory, a TDM bus an addressable bus or any other type of bus. In such embodiment, the decoders 451a-n and/or the HSB 453a-m may comprise a frame memory module.

Each HSB 453a-m may compose a horizontal stripe. A horizontal stripe may comprise decoded video data obtained from different decoders 451a-n via DVCI 452 according to instructions received from the CP manager (CPM) 442, such as which decoded video data is needed for composing the horizontal stripe which is associated to the relevant HSB 453a-m; and the order in which to compose the decoded input video images in the horizontal stripe.

One embodiment of an HSB 453 may obtain, according to the association instructions, a plurality of decoded input images from one or more frame memories stored at the DVCI 452. The HSB 453 may fetch the decoded input images according to their frame number. The HSB 453 may build/compose a horizontal stripe from the plurality of fetched decoded video images. The HSB 453 may re-number the frames and may encode the horizontal stripe via an encoder 455. The compressed horizontal stripe may be output toward the CHSCI 456.

The HSBs 453a-m may further include a menu generator and a background generator (not shown in the drawings). Before encoding a horizontal stripe, the menu generator and background generator may generate and/or add text, frames, or backgrounds. The operation of the HSBs 453a-m is described in more detail below in conjunction with FIGS. 5 and 6.

The CHSCI 456 may comprise a plurality of shared cyclic memories. Each cyclic memory may be associated with an HSB 453. Each cyclic memory may be divided into sections. Each section may be associated with an HSB 453. In an embodiment in which H.264 is used, each location (record) in a section of the cyclic buffer may store a Network Abstraction Layer (NAL) chunk of compressed macro-blocks of the relevant horizontal stripe.

One embodiment of a CPVP 450a-x may further comprise a plurality of CPISGs 457a-k. Each CPISG 457 may receive instructions from the CPM 442. Example instructions may include information regarding the layout type required and information on the horizontal stripes required for each layout. Each CPISG 457a-k may be associated, via CHSCI 456, with a group of HSB 453a-m, which is needed to compose the relevant CP video image generated by that CPISG 457a-k.

The CPISG 457 may start reading from one or more cyclic memories in the CHSCI 456, in order to generate the relevant CP video image. From each cyclic memory, the CPISG 457 may fetch horizontal stripes with the same frame number in order to create/generate a CP image. CPISG 457 may begin by reading from the cyclic memory that stores the first horizontal stripe, starting from the top stripe to the bottom stripe, in the CP image it is currently generating. CPISG 457 may start collecting one or more NALs from the appropriate horizontal stripe frame memory of the CHSCI 456. After collecting all the NALs associated with the horizontal stripe, CPISG 457 may move to the cyclic memory that stores the next horizontal stripe in the CP image it is generating.

For each NAL, the CPISG 457 may manipulate fields in the NAL header, such as the Macro Block Address (MBA) of the first Macro Block (MB) in the NAL, in order to adapt it to the MBA in the relevant CP video image. After manipulating the NAL, the manipulated NAL is transferred toward the CCPCI 458 via the NI 420 to the appropriate endpoint 330 and the next NAL of the same horizontal stripe in the CHSCI 456 is fetched. Upon handling the last NAL in that stripe, CPISG may obtain the first NAL of the following stripe, below the last one, wherein the frame memory of the new NAL is the same as the frame number as in the upper stripe. Once a CP image has been generated the frame number is increased by one, and the CPISG 457 may start with the top stripe having the next consecutive frame number.

The NI 420 may obtain the relevant manipulated NALs from the CCPCI 458 via link 424. The NI 420 may process the NALs according to the appropriate communication protocols and add the appropriate control and status data to the NAL. The appropriate protocols are the protocols used over the physical layer, data link layer and transport layer used in network 310. The added data may include MAC ID source and destination addresses, and a checksum. Then the fetched CP images are sent toward the relevant endpoints 330*a-n*. If one of the received video images from an endpoint 330 is divided into horizontal stripes (AU and AL in FIG. 2, for example) the CPISG 457 may send the horizontal stripes AU and then AL of the same frame number. More information regarding the processes of the CPVPs 450 is disclosed below in conjunction with FIGS. 5 and 6.

Figure 5:
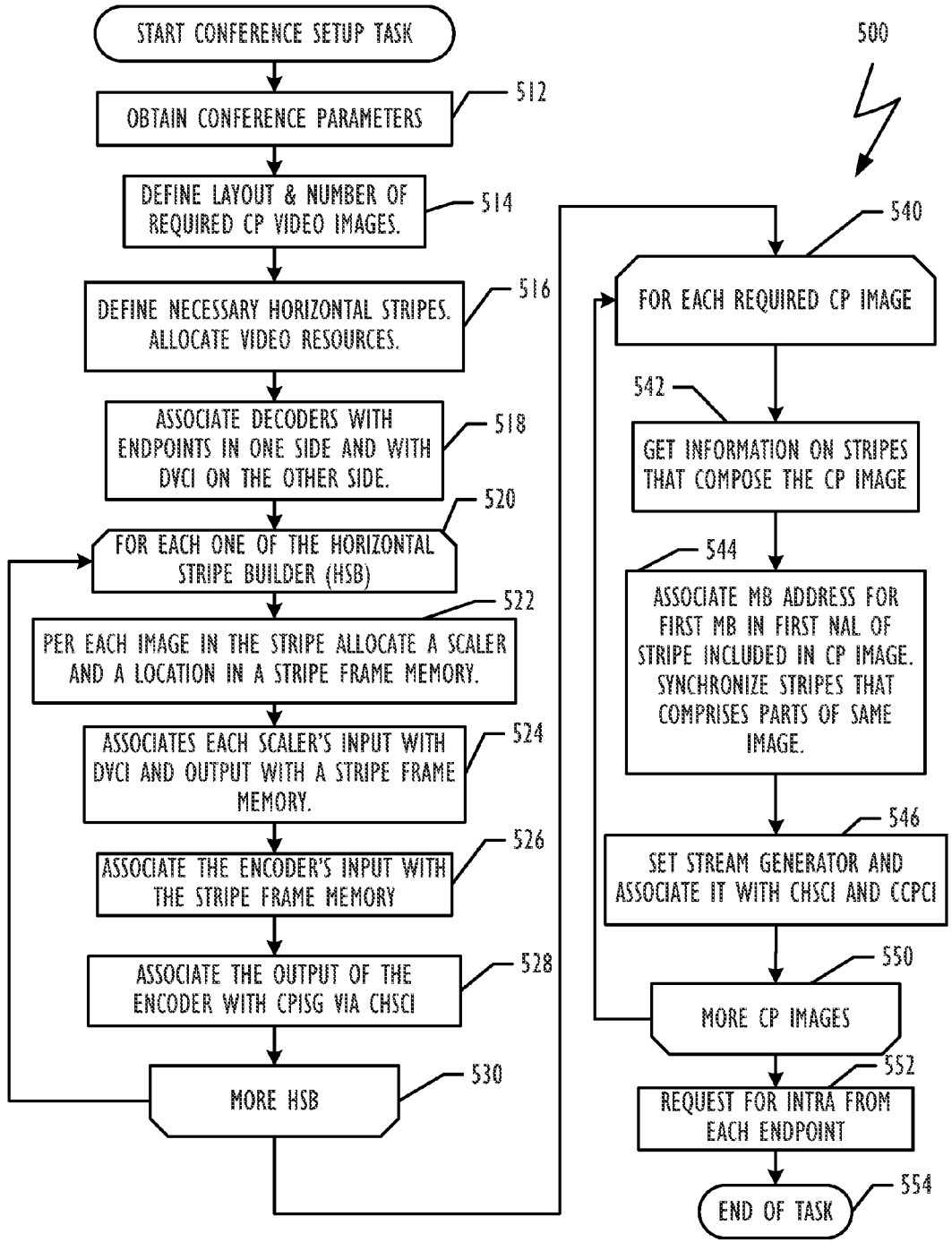
FIG. 5 is a flowchart illustrating relevant acts of an example preparation process, according to teaching of the present disclosure.

FIG. 5 is a flowchart that illustrates acts of a preparation technique 500 according to one embodiment. Technique 500 may be implemented by the CPM 442. Technique 500 may obtain in block 512 conference parameters, such as the number and which endpoints 330*a-n* are taking part in the conference; the capabilities of the different endpoints 330*a-n*; the required layout, resolution, and compression standard, etc. Technique 500 may define in block 514 the different possible CP video images that may be used in that layout.

Based on the defined different possible CP video images, in block 516 the required horizontal stripes that are needed for composing the different possible number of CP video images and their combinations are defined. In one embodiment, a look up table (LUT) may be used to define the number of CP video images and the required horizontal stripes, based on the required layout. After collecting the conference parameters, defining the number of CP video images, and the number of horizontal stripes, a CPVP 450 may be allocated and assigned to the conference as well as the required video resources in block 516, such as decoders 451*a-n*, HSBs 453*a-m*, and CPISGs 457*a-k*. An association between the decoders 451*a-n* and the endpoints 330*a-n* may be made in block 518. An association between the decoders 451*a-n* and the relevant memories in the DVCI 452 may also be made in block 518.

A loop may start in block 520 for each one of the HSBs 453*a-m*. A scaler may be allocated in block 522 for each image in the horizontal stripe. The scaler may fetch the image stored in the relevant DVCI 452 memory and resize (scale and/or crop) it to the required size of its segment in the stripe. Each image is associated with a location in the relevant horizontal stripe, by associating in block 522 the image received from a decoder with a location in a horizontal stripe frame memory. Each scaler's input may be associated in block 524 with the DVCI 452. The output of each scaler may also be associated in block 524 with a location in the horizontal stripe frame memory.

An association between the input of the encoder 455 of the relevant HSB 453 and the horizontal stripe frame memory may be made in block 526. The HSB's encoders 455 may compress the video data from the horizontal stripe frame memory and organize the compressed horizontal stripe's MBs into NALs. Each horizontal stripe may start with a new NAL. The HSB's encoders 455 may assign the frame number of the NALs such that all the NALs in the same horizontal stripe will have the same frame number. Synchronization between the frame number of each split images (AU 250 and AL 251 in FIG. 2, for example) may be made in block 526 as well.

An association between the outputs of the HSB's encoder 455 and a CPISG 457*a-k* via the CHSCI 456 may be made in block 528. A decision is made in block 530 whether there are more HSBs 453 that need to be handled. If there are, then technique 500 may return to block 520 and process the next HSB 453. If there are no more HSBs, then technique 500 may proceed to block 540.

In block 540, a loop may begin for each one of the CP images that is needed in the conference. Information on the horizontal stripes that are needed to compose the CP image may be fetched in block 542, including which horizontal stripes are needed, the MBA of the first MB of that stripe in the CP video image, and the number of MBs of that stripe. Layout information related to the stripe may be obtained, such as the order of the horizontal stripes in the CP image.

A manipulation on the MBAs of each stripe may be performed in block 544, such as changing the MBA of the first MB in each stripe, according to its MBA in the CP image. At this point, a CPISG 457*a-k* may be assigned to the relevant CP video image and be set in block 546 according to the results of block 544. The assigned CPISG may be associated in block 546 with the CHSCI 456 and with the CCPCI 458. A decision is made in block 550 whether there are more CP video images to be handled. If there are, then technique 500 may return to block 540. If there are no more, then technique 500 may proceed to block 552 and requests an Intra from each endpoint in order to start the conference. Then technique 500 may terminate in block 554.

During the conference session, if a change in the CP video images is needed due to the dynamic of the session, such as replacing a current speaker, or a presented conferee, or joining a new participating endpoint, technique 500 may be modified for handling the changes in the CP images. For example, if a current speaker is changed, then one or more cycles of the loop between blocks 520 and 530 may be implemented to handle the horizontal stripes that include the images of the current speaker and the new speaker. The loop between blocks 540 and 550 may also be modified.

Figure 6:
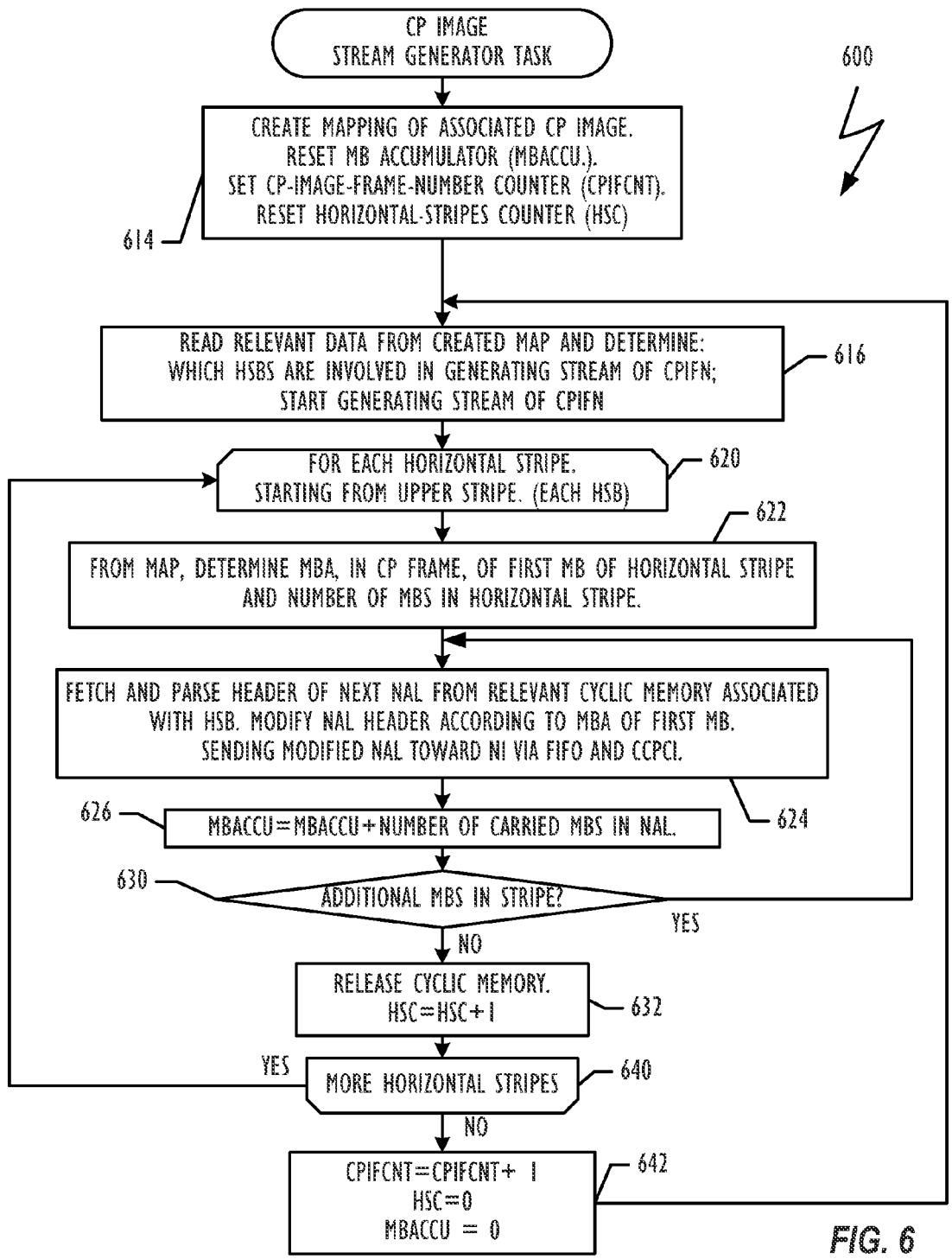
FIG. 6 is a flowchart illustrating relevant acts of a process for creating a stream of compressed CP video image from a plurality of horizontal stripes, according to one embodiment.

FIG. 6 is a flowchart illustrating a technique 600 for creating a stream of compressed CP video images from a plurality of horizontal stripes according to one embodiment, in which the H.264 compression standard is used. Technique 600 may be executed by CPISGs 457*a-k*. A mapping of associated CP image may be created in block 614. The mapping may include the required horizontal stripes; the required order of the horizontal stripes; the first MB address of each horizontal stripe; the number of MBs in each horizontal stripe; and an indication on a split image (AU and AL of FIG. 2, for example) if one exists. An MB accumulator (MBaccu) may be reset in block 614. A CP Image frame number counter (CPIFcnt) may also be set in block 614. A horizontal stripe counter (HSC) may also be set in block 614 according to the number of stripes in the CP image.

Technique 600 may start generating a first stream of a CP image in block 616. The relevant data, from the created map, may be read in block 616 and conclusions maybe determined, for example, which HSB 453 is to be read first. Then an inner loop having a cycle for each horizontal stripe may begin in block 620. In block 622, the information regarding the current stripe is read from the created map and conclusions may be determined, such as which HSB 453 is involved in the current horizontal stripe; the MB address of the first MB of the specific horizontal stripe in the CP image; and the number of MBs in that horizontal stripe. Another inner loop may begin in block 624 in which the header of a next NAL may be fetched from the relevant cyclic memory associated with that HSB. The NAL header may also be processed in block 624. The MB address of the first MB in the NAL is adapted to match the MBA in the CP image. The adaptation may be made by adding the MBA of the first MB of that stripe in the CP image to the MBA that is written in the header of the current NAL. Further, the frame number in the header of the NAL may be replaced by the value of the CPIFcnt. The processed NAL may be sent in block 624 toward the NI 420 via a FIFO and CCPCI 458.

The MBaccu may be increased in block 626 by the relevant number of MBs that were carried in that NAL. A decision is made in block 630 whether additional MBs exist in the horizontal stripe. If additional MBs exist, then technique 600 may return to block 624. If not, then technique 600 may proceed to block 632. In block 632, the cyclic memory may be released and the HSC may be increased in block 632 by one. A decision is made in block 640 whether more horizontal stripes are required for the CP image. If there are, then technique 600 may return to block 620. If no more are required, then technique 600 may proceed to block 642.

In block 642, the CPIFcnt may be incremented by one; the horizontal stripes counter may be reset to zero; and the MBaccu may also be reset to zero. Next technique 600 may return to block 616.

In this application the words "module," "device," "component," and "module" are used interchangeably. Anything designated as a module or module may be a stand-alone module or a specialized module. A module or a module may be modular or have modular aspects allowing it to be easily removed and replaced with another similar module or module. Each module or module may be any one of, or any combination of, software, hardware, and/or firmware. Software of a logical module may be embodied on a computer readable medium such as a read/write hard disc, CDROM, Flash memory, ROM, etc. In order to execute a certain task a software program may be loaded to an appropriate processor as needed.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above-described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different embodiments along the disclosure.

It is to be understood that the above description is intended to be illustrative, and not restrictive. For example, the above-described embodiments may be used in combination with each other. Many other embodiments will be apparent to those of skill in the art upon reviewing the above description.

The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
   composing a plurality of compressed horizontal stripes, each compressed horizontal stripe comprising data corresponding to a plurality of video images received from a plurality of endpoints of a multipoint videoconferencing system; and
   generating a first compressed continuous presence video image from a first subplurality of the plurality of compressed horizontal stripes,
   wherein the width of each composed horizontal stripe equals the width of a row of the first compressed continuous presence video image.

2. The method of claim 1, further comprising:
   generating a second compressed continuous presence video image from a second subplurality of the plurality of compressed horizontal stripes.

3. The method of claim 2, wherein the plurality of video images comprises at least five video images and the plurality of compressed horizontal stripes comprises five compressed horizontal stripes, further comprising:
   generating a third compressed continuous presence video image from a third subplurality of the plurality of compressed horizontal stripes;
   generating a fourth compressed continuous presence video image from a fourth subplurality of the plurality of compressed horizontal stripes; and
   generating a fifth compressed continuous presence video image from a fifth subplurality of the plurality of compressed horizontal stripes,
   wherein the first, second, third, fourth, and fifth compressed continuous presence video images are each organized in a 2×2 layout.

4. The method of claim 2, wherein the first subplurality of the plurality of compressed horizontal stripes and the second subplurality of the plurality of compressed horizontal stripes are mutually exclusive of each other.

5. The method of claim 1, wherein the act of composing a plurality of compressed horizontal stripes comprises:
   composing a first compressed horizontal stripe, comprising data corresponding to a first subplurality of the plurality of video images; and
   composing a second compressed horizontal stripe, comprising data corresponding to a second subplurality of the plurality of video images.

6. The method of claim 5, wherein the first subplurality of the plurality of video images and the second subplurality of the plurality of video images are mutually exclusive of each other.

7. The method of claim 1, wherein the act of composing a plurality of compressed horizontal stripes comprises:

decoding the plurality of video images into a plurality of decoded video images.

8. The method of claim 7, wherein the act of composing a plurality of compressed horizontal stripes comprises:
resizing a decoded video image of the plurality of decoded video images to a size of a segment in a horizontal stripe; and
storing the resized decoded video image in a stripe frame memory.

9. The method of claim 8, further comprising:
compressing the resized decoded video image stored in the strip frame memory.

10. The method of claim 1, wherein the act of composing a plurality of compressed horizontal stripes comprises:
composing each of the plurality of compressed horizontal stripes with a width corresponding to the width of the continuous presence video image.

11. The method of claim 1, wherein the act of composing a plurality of compressed horizontal stripes comprises:
composing each of the plurality of compressed horizontal stripes with a height no less than the height of a smallest segment in the compressed horizontal stripe.

12. The method of claim 1, wherein the act of generating a first compressed continuous presence video image comprises:
generating a first compressed continuous presence video image for a first endpoint of the plurality of endpoints from at least two of the plurality of compressed horizontal stripes composed from video images received from endpoints of the plurality of endpoints other than the first endpoint.

13. The method of claim 1, wherein the method is performed by an MCU.

14. The method of claim 1, further comprising:
defining the plurality of compressed horizontal stripes responsive to a layout of a multipoint videoconferencing session.

15. The method of claim 14, the act of defining the plurality of compressed horizontal stripes comprising:
defining a plurality of compressed continuous presence video images responsive to a layout of a multipoint videoconferencing session, wherein the first compressed continuous presence video image is one of the plurality of compressed continuous presence video images; and
defining the first subplurality of the plurality of compressed horizontal stripes responsive to the act of defining the plurality of compressed continuous presence video images.

16. The method of claim 14, the act of defining the plurality of compressed horizontal stripes comprising:
defining the plurality of horizontal stripes responsive to a lookup table.

17. The method of claim 14, wherein the act of defining the plurality of horizontal stripes is performed responsive to a change in the multipoint videoconferencing session.

18. A continuous presence video conferencing port for a multipoint control unit, comprising:
a first horizontal stripe builder, configured to store a first plurality of decoded video images obtained from a first subplurality of a plurality of endpoints as a first horizontal stripe, and to compress the stored first horizontal stripe;
a second horizontal stripe builder, configured to store a second plurality of decoded video images obtained from a second subplurality of the plurality of endpoints as a second horizontal stripe and to compress the stored second horizontal stripe; and
a continuous presence image stream generator, configured to create a compressed continuous presence image stream from the first compressed horizontal stripe and the second compressed horizontal stripe and to output the compressed continuous presence image stream toward an endpoint of the plurality of endpoints,
wherein the width of the each horizontal stripe equals the width of a row of a compressed continuous presence video image in the compressed continuous presence image stream that includes that horizontal stripe.

19. The continuous presence video conferencing port of claim 18, further comprising:
a plurality of decoders, each configured to decode a video stream from an endpoint of the plurality of endpoints into a decoded video image,
wherein the first horizontal stripe builder obtains the first plurality of decoded video images from a first subplurality of decoders, and
wherein the second horizontal stripe builder obtains the second plurality of decoded video images from a second subplurality of decoders.

20. The continuous presence video conferencing port of claim 18, further comprising:
a horizontal stripe frame memory,
wherein the first horizontal stripe builder stores the first horizontal stripe in the horizontal stripe frame memory in a location assigned to a segment in a layout of a videoconferencing session.

21. A multipoint control unit, comprising:
a continuous presence videoconferencing port, comprising:
a first horizontal stripe builder, configured to store a first plurality of decoded video images obtained from a first subplurality of a plurality of endpoints as a first horizontal stripe, and to compress the stored first horizontal stripe;
a second horizontal stripe builder, configured to store a second plurality of decoded video images obtained from a second subplurality of the plurality of endpoints as a second horizontal stripe, and to compress the stored second horizontal stripe; and
a continuous presence image stream generator, configured to create a compressed continuous presence image stream from the first compressed horizontal stripe and the second compressed horizontal stripe and to output the continuous presence image stream toward a first endpoint of the plurality of endpoints; and
a controller, coupled to the continuous presence videoconferencing port and configured to:
define the first compressed horizontal stripe and the second compressed horizontal stripe;
associate the continuous presence image stream generator with the first horizontal stripe and the second horizontal stripe; and
associate the continuous presence image stream generator with the first endpoint,
wherein the width of each horizontal stripe equals the width of a row of a compressed continuous presence video image in the compressed continuous presence image stream that includes that horizontal stripe.

22. The multipoint control unit of claim 21, further comprising:

a plurality of decoders, each configured to decode a video stream from an endpoint of the plurality of endpoints into a decoded video image, wherein the first horizontal stripe builder obtains the first plurality of decoded video images from a first subplurality of decoders, and wherein the second horizontal stripe builder obtains the second plurality of decoded video images from a second subplurality of decoders.

23. The multipoint control unit of claim 21, wherein the continuous presence videoconferencing port further comprises:

a horizontal stripe frame memory, wherein the first horizontal stripe builder stores the first horizontal stripe in the horizontal stripe frame memory in a location assigned to a segment in a layout of a videoconferencing session.

24. The multipoint control unit of claim 21, wherein the first plurality of decoded video images and the second plurality of decoded video images are received from endpoints of the plurality of endpoints other than the first endpoint.

25. The multipoint control unit of claim 21, wherein the first horizontal stripe has a width that corresponds to the width of a continuous presence video image defined by the continuous presence image stream.

26. The multipoint control unit of claim 21, wherein the first horizontal stripe has a height equal to the height of a smallest segment in a continuous presence video image defined by the continuous presence image stream.

* * * * *